Patented June 15, 1948

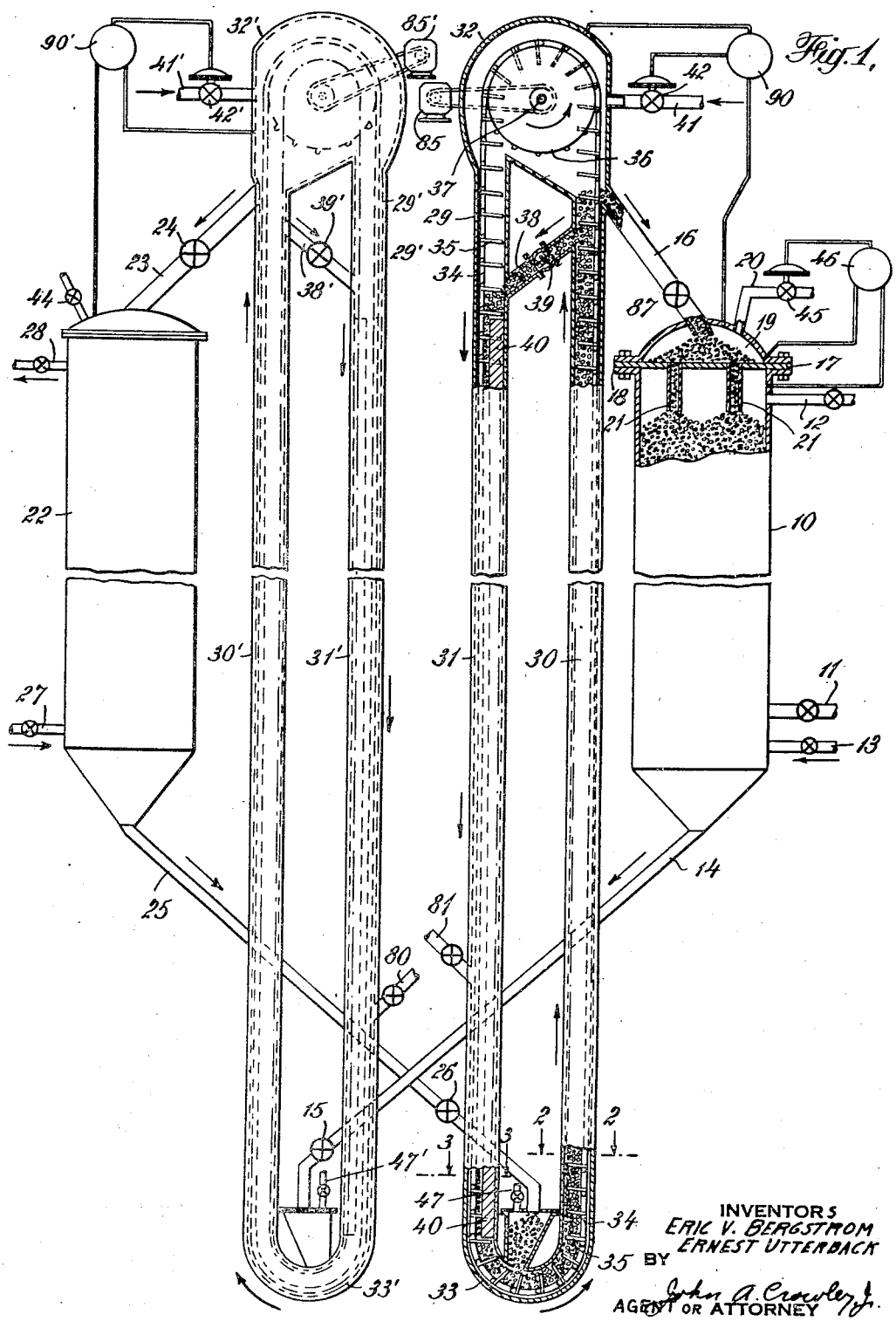
June 15, 1948    E. V. BERGSTROM ET AL    2,443,412
METHOD AND APPARATUS FOR TRANSFER OF PARTICLE FORM SOLIDS
Filed June 23, 1945    2 Sheets-Sheet 1
INVENTORS
ERIC V. BERGSTROM
ERNEST UTTERBACK
BY John A. Crowley Jr.
AGENT OR ATTORNEY

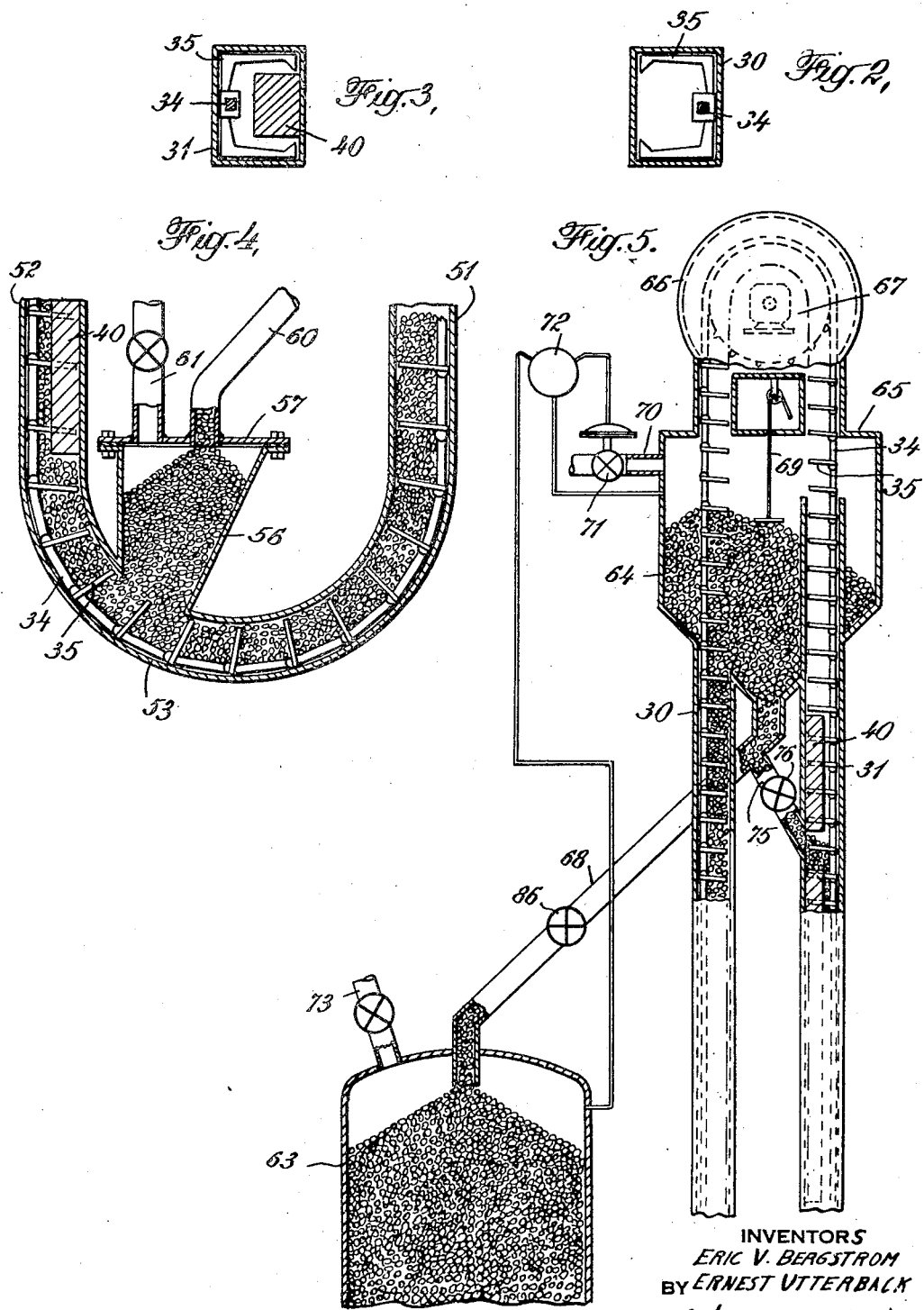

2,443,412

UNITED STATES PATENT OFFICE 2,443,412

METHOD AND APPARATUS FOR TRANSFER OF PARTICLE FORM SOLIDS

Eric V. Bergstrom, Short Hills, N. J., and Ernest Utterback, Upper Darby, Pa., assignors to Socony-Vacuum Oil Company, Incorporated, a corporation of New York Application June 23, 1945, Serial No. 601,090

23 Claims. (Cl. 196—52)

1

This invention has to do with a method and apparatus for transfer of particle form solid material between zones wherein it is contacted with different gases, often under different gaseous pressures while maintaining a substantial seal between said zones. The invention is applicable to any of a number of processes involving the flow of a particle form solid through separate chambers wherein it is contacted with gaseous materials. Exemplary of such processes are gas adsorption, gas treatment, solid treatment, solid-gas heat exchange, shale and ore roasting and catalytic conversion processes. This invention is particularly applicable to hydrocarbon catalytic conversion processes. Recently such hydrocarbon conversion processes have taken the form of one wherein a particle form catalyst is passed cyclically through a conversion zone wherein it is contacted at high temperatures with hydrocarbon vapors to accomplish the conversion thereof and causing the deposition of carbonaceous contaminants upon the catalyst and then through a regeneration zone wherein it is contacted at high temperatures with a combustion supporting gas such as air to effect the burning of the contaminant deposit from the catalyst. The hydrocarbon charge to the conversion zone may be a gas oil in which case it may be converted at temperature of the order of 800° F. and above and usually superatmospheric pressures to gas, gasoline and cycle oil. On the other hand the charge to the conversion zone may be gasoline, or heavy naphtha in which case a high temperature treatment or molecular rearrangement may be the purpose.

The catalyst may take the form of a natural or treated clay or bauxite or it may consist of any of a number of synthetic associations of silica, alumina or silica and alumina to which other materials such as metallic oxides may be added for specific purposes inherent in the conversion for which it is used. The catalyst may be pelletted, spherical or granular in form and its particle size may vary. This invention is particularly directed to processes wherein contact mass materials of relatively large particle size, for example of the order of ⅜" average diameter, are involved.

In such cyclic, continuous conversion processes, it is, of course, important to prevent interflow of gases between the regeneration and conversion vessels and to prevent the escape of the high temperature hydrocarbon vapors into the atmosphere. In certain instances either the reactor or regeneration vessel may be operated at the higher pressure although more often it is customary to

2 operate the reactor at a pressure somewhat higher or equal to that in the regenerator. In any case, it will be apparent that a major difficulty arises in the transfer of catalyst from one vessel to the other while preventing interflow of gases between the vessels. Heretofore it has been customary to employ complicated lock and seal chamber arrangements, mechanical gas tight forced feed valves or star valves or screw conveyors in addition to various types of elevating conveyors in order to accomplish the transfer of catalyst between reactor and regenerator vessels. Lock and seal chamber arrangements are expensive, complicated and space consuming and require a large amount of complicated instrumentation which is susceptible to frequent failure. Forced feed valves and screw conveyors involve close metal to metal clearances which give rise to excessive and highly undesirable catalyst particle attrition.

A major object of the instant invention is the provision in a hydrocarbon conversion process of a practical and economical method and apparatus for transfer of particle form solid catalytic material between reaction and regeneration chambers without excessive catalyst attrition and while providing a substantial seal between the reaction and regeneration chambers.

Another major object of this invention is the provision in a process wherein a particle form solid material is passed serially through two separate solid-gas contacting chambers of an economical method and apparatus for transfer of said solid material between chambers while preventing substantial interflow of gaseous material between the chambers.

A specific object of this invention is the provision in a process wherein a particle form solid material is passed cyclically through separate chambers maintained under different gaseous pressures of a method and apparatus for transfer of said solid material from the lower end of one of said chambers to the upper end of the other of said chambers without substantial gas flow between said chambers, without excessive attrition of the particle form solid and with a minimum requirement of conveyor height.

These and other objects of this invention will become apparent from the following description of the invention. According to the instant invention particle form solid material is conducted from one or two separate chambers through a confined passage to a point adjacent the lower end of a substantially upright, closed casing or rising leg. It is then conducted upwardly through the rising leg as a confined substantially compact column of solid particles by means of an endless draft mechanism moving upwardly through the rising leg and downwardly through a descending leg in communication with said rising leg at its ends. The solid material is then conducted by gravity flow through a suitable confined passage from the upper section of said rising leg to the second chamber. Such draft type conveyors whereby solid material may be moved en masse without appreciable attrition are well known to the art, a typical example being the Redler conveyor. Heretofore the endless draft mechanism which usually takes the form of an endless chain with flights attached moves downwardly through a substantially empty descending leg, the solid material being introduced at a boot section at its lower end so that a column of solid material is maintained only in the rising leg. As a result any gaseous pressure existing at either end of the rising leg is at once communicated to the other end through the empty descending leg, thereby preventing the maintenance of a seal. By the present invention solid material is also introduced into the descending leg in controlled amounts so as to maintain a column of solid material therein, thereby providing an effective seal between the two chambers between which the solid material is transferred. In many applications this seal may be improved by the introduction of an inert gas to the upper section of the conveyor casing above the solid material in the conveyor rising and descending legs.

The invention may be more readily understood by references to the drawings attached hereto of which Figure 1 is an elevational view, partially in section, showing the application of this invention to a cyclic hydrocarbon conversion process, Figure 2 is a cross-sectional view taken at line 2—2 in Figure 1, Figure 3 is a cross-sectional view taken at line 3—3 on Figure 1, Figure 4 is an elevational view, partially in section showing the preferred construction at the lower end of the conveyor casings of Figure 1, and Figure 5 is an elevational view, partially in section, showing a preferred and modified arrangement at the upper end of the conveyor casings. All of these drawings are highly diagrammatic in form.

Turning now to Figure 1, we find an upright reaction vessel 10 which may be of any desired cross-sectional shape. The reaction vessel is provided with a reactant inlet 11, a reactant outlet 12, a purge gas inlet 13, a catalyst drain conduit 14 with throttle valve 15 thereon and a catalyst inlet conduit 16 with valve 87 thereon at its upper end. A partition 17 extends across the upper section of the vessel 10 between flanges 18 thereby providing a seal chamber 19. A gas inlet conduit 20 is provided at the top of the chamber 19. A plurality of conduits 21 depend from partition 17 for flow of catalyst from the seal zone to the reaction zone therebelow. Also shown in Figure 1, is a regenerator vessel 22 provided at its upper end with catalyst inlet conduit 23 having valve 24 thereon and at its lower end with catalyst drain conduit 25 with flow control valve 26 thereon. A regeneration gas inlet 27 and outlet 28 are also provided on vessel 22. It will be understood that suitable internal means for distributing and directing the gas and catalyst flow within the regenerator and reaction vessels may also be provided. These means may be of construction well known to those skilled in the art and are not shown. Also there may be provided within the regenerator suitable means for controlling the catalyst temperature during the regeneration thereof. It will be further understood that reaction and regeneration vessels of construction other than that shown may be employed within the scope of this invention. Arranged between the vessels are two similar draft type conveyors 29 and 29'. The conveyor 29 is made up of a casing including a substantially closed rising leg 30, a substantially closed descending leg 31, a substantially closed head section 32 communicating the upper ends of said legs and a substantially closed, preferably curved, boot section 33 communicating the lower ends of said legs. Extending longitudinally through said casing is a draft mechanism in the form of an endless chain 34 which may have flights 35 attached at intervals along its length. The chain 34 extends over a sprocket 36 positioned in head section 32 and an external driving mechanism such as a variable speed motor 85 is provided to drive the sprocket 36 through shaft 37 thereby causing the draft mechanism to move at adjustable rates upwardly through rising leg 30 and downwardly through descending leg 31. A conduit 38 carrying throttle valve 39 thereon extends downwardly from the upper section of the rising leg 30 to a point therebelow on descending leg 31. Extending through a major portion of the length of descending leg 31 is a solid block or volume obstructing means 40 which will be further described hereinafter. A gas inlet conduit 41 carrying valve 42 is provided on the head section 32.

In operation, assuming for purposes of example that the reactor 10 is operated at about 10 pounds per square inch gauge and the regenerator 22 at a pressure only slightly over atmospheric, catalyst moves downwardly through the conversion vessel 10 as a substantially compact column being contacted at temperatures of the order of 800° F.–900° F. countercurrently with hydrocarbon reactant vapor introduced through conduit 11 and withdrawn through conduit 12. Alternatively countercurrent flow may be provided by reversing the functions of conduits 11 and 12. The oil charge space velocity may vary from about 0.5 to 5.0 or higher volumes of oil (measured as a liquid at 60° F.) per volume of catalyst in the reaction zone and the catalyst to oil ratio may vary from about 0.5 to 5.0 volumes of catalyst per volume of oil charge (measured as a liquid at 60° F.). Spent catalyst is purged of hydrocarbons by means of an inert purge gas such as steam or flue gas introduced through conduit 13. Purged spent catalyst then passes at a rate controlled either by throttle valve 15 or preferably by the regulated speed of motor 85' and of the draft mechanism in conveyor 29' through conduit 14 into the boot section 33' of conveyor 29'. It will be understood that other arrangements for introduction of catalyst into the lower section of the conveyor casing may be provided within the scope of this invention. The catalyst is then moved upwardly through rising leg 30' by the endless draft mechanism, and a portion of the catalyst reaching the upper section of leg 30' is conducted by gravity flow through conduit 23 to the upper section of regenerator 22. The amount of catalyst so conducted to the regenerator may be preferably controlled by means of control of the rate of catalyst flow from the bottom of the regenerator through conduit 25. This may be accomplished preferably by regulation of the speed of the draft mechanism in the conveyor 29 or by means of variable speed drive motor 85; or it may be accomplished by means of valve 26 on conduit 25. A surge chamber and level indicating device (not shown) may be provided in the upper section of vessel 22. The remainder of the catalyst reaching the upper section of rising leg 30' is conducted through conduit 38' and flow control valve 39' to a point therebelow on descending leg 31' so as to provide a substantially compact column of said catalyst within the descending leg 31'. The catalyst so introduced into leg 31' moves slowly downwardly therethrough and is then conducted through the boot section 33' and then up again through leg 30'. Thus, there is provided an effective solid catalyst seal between the lower section of the reaction vessel 10 and the upper section of regenerator 22. The inert purge gas which has been introduced through conduit 13 into the lower section of vessel 10 is at a pressure somewhat above that maintained within the reaction zone of vessel 10 so as to prevent escape of hydrocarbons from the bottom of the reactor. A small amount of this purge gas will force its way downwardly through the compact column of catalyst maintained in drain conduit 14 and then upwardly through the additional elongated compact columns of catalyst provided in rising leg 30' and descending leg 31' and will then pass along with the catalyst through conduit 23 into the upper section of regenerator 22 from which it may be withdrawn through such an outlet as 44. The amount of such inert gas so passing into the upper section of the regenerator will be relatively small and unobjectionable due to the considerable length of seal catalyst provided between the reaction and regeneration zones. It will be noted that the inner flow of hydrocarbons from the reaction to regeneration zone has been substantially completely prevented.

The catalyst then passes downwardly through the regenerator wherein it is contacted at temperatures of the order of 900° F.–1200° F. with combustion-supporting gas such as air or air flue gas mixtures introduced through conduit 27 and withdrawn through conduit 28. The regenerated catalyst is then withdrawn from the regenerator through conduit 25 at a rate controlled either by throttling valve 26 or the draft conveyor 29. The regenerated catalyst is conveyed from boot 33 of conveyor 29 upwardly through rising leg 30. A portion of the catalyst reaching the upper section of rising leg 30 is withdrawn through conduit 16 into seal section 19 of the reaction vessel 10. The rate of catalyst so withdrawn through conduit 16 is generally indirectly controlled by the amount of catalyst withdrawn from the lower end of the reaction vessel through conduit 14. The remainder of the catalyst reaching the upper section of rising leg 30 is conducted through conduit 38 and flow control valve 39 to a point on the descending leg 31 therebelow so as to maintain a column of said catalyst in said descending leg. Thus, in conveyor 29 as in conveyor 29' substantially compact columns of particle form catalyst are provided and maintained within the rising leg 30 and the descending leg 31 and thereby provide effective gas seals between the reactor and regenerator vessels. An inert seal gas such as steam or flue gas may be introduced into seal section 19 of vessel 10 through conduit 20 at a rate controlled by valve 45 on conduit 20. The pressure within seal chamber 19 may be automatically maintained slightly above that in the reaction vessel therebelow by use of an ordinary differential pressure control mechanism 46 which operates valve 45. Most of the inert gas so introduced through conduit 29 will pass downwardly through conduit 21 into the reaction zone and be removed therefrom along with the reaction products. A small amount of inert gas will pass upwardly through a substantially compact stream of catalyst maintained in conduit 16 and then downwardly through the elongated compact columns of catalyst maintained in rising leg 30 and descending leg 31 and then upwardly from boot section 33 through the catalyst entering that section from the regenerator through conduit 25. The amount of this inert gas will be very small due to the length of the catalyst seal maintained between the vessels. Its flow to the regenerator through conduit 25 may be avoided entirely by withdrawal from the boot section 33 through conduit 47.

Alternatively, the use of seal section 19 and the introduction of seal gas thereinto through conduit 20 may be eliminated and inert seal gas may be introduced into the upper section by the conveyor casing 29 through conduit 41. In this event, the pressure of the inert gas within the upper section of the conveyor 29 may be maintained slightly above that in the highest pressure vessel, (in this case the reactor) by means of a differential pressure control instrument 90 which automatically operates the diaphragm valve 42 on gas inlet conduit 41.

In the above-described operation, the pressure within the reaction vessel was assumed to be maintained substantially above that in the regenerator. The invention is also applicable to operations wherein the pressures within the reaction and regeneration vessels are maintained substantially equal. Thus, for example, the pressure in either vessel might be maintained at ten pounds per square inch gauge. In such instances, the maintenance of a seal gas pressure within seal chamber 19 of the reactor 10 and in the lower section of the reactor by introduction through conduit 13, plus the maintenance of substantially compact elongated columns of catalyst within the conveyor rising and descending legs will alone adequately prevent interflow of reactant gases between the reaction and regeneration vessels. If further protection is desired, seal gas may be introduced into the upper section of conveyor 29 through conduit 41 as already described and similarly into the upper section of conveyor 29' through conduit 41' and diaphragm valve 42'. In this case, since the pressures in the reaction and regeneration vessels would be substantially equal, the inert gas pressure maintained in the upper sections of both conveyor casings would be substantially equal and slightly above that in the reaction and regeneration vessels. As has already been pointed out, the apparatus of this invention may be utilized in processes other than a hydrocarbon conversion process. In some such processes, it may be desirable to operate both vessels 10 and 22 at substantially atmospheric pressure. In this case, it may be desirable to use the gas vent 47' on the boot section 33' of conveyor 29' in the same manner as described for the gas vent 47 in the boot section 33 of conveyor 29 hereinabove. It may further be desirable in such a process to maintain an inert gas atmosphere at the upper sections of either or both conveyor casings by means already described. In the hydrocarbon conversion operation described above the vent 47' is not used.

Turning now to Figure 2, we find a cross-sectional view taken at line 2—2 in the conveyor rising leg 30 of Figure 1. In Figure 2, is shown the rising leg 30, the endless chain 34 with flights 35 attached thereto. Flights 35 may be constructed of steel or other suitable metal and shaped substantially as shown or they may take any of a number of shapes used in draft-type conveyors. It will be noted that the conveyor chain and flights occupy only a small proportion of the cross-sectional area of the rising leg 30 so as to leave a large open space 50 for occupation by the catalyst particles. In order to prevent jamming solid particles between the flights and the conveyor casing, particularly near the lower end of the descending leg it is important that the flights be so constructed as to limit the clearance between the flights and the conveyor casing below the average particle diameter of the solid material to be conveyed.

Coming now to Figure 3, we find a cross-sectional view taken at line 3—3 on descending leg 31. In this figure, again may be seen the conveyor chain 34 and flights 35 and also the space obstructing member 40 which extends through at least most of the descending leg length. The purposes of this obstructing member is to substantially reduce the free cross-sectional area of the descending leg available for catalyst particles. Thus, the free volume for catalyst particles within the descending leg 31 is substantially less than that in the rising leg 30. As a result, substantially less catalyst is conveyed downwardly through the descending leg 31 than is conveyed upwardly through the rising leg 30, thereby aiding in the maintenance of a substantially compact column of catalyst throughout the remaining free volume of the descending leg 31. The shape of the obstructing block 40 may be as shown or it may take any of a number of shapes provided that it is so shaped and of such size as to avoid interference with the free movement of the draft chain 34 and flights 35. It should be further so limited in size as to avoid close metal clearances between the flights 35 and the block 40 itself. In other words, the space remaining between the block 40 and the flights 35 should be substantially larger than the catalyst particle diameters so as to prevent attrition of catalyst and so as to permit the free filling of the void spaces with catalyst particles. It will be understood that with proper modification of the shape of the flights 35, the descending leg 31 may itself be of less total cross-sectional area than the rising leg 30 so as to obtain the same result as the provision of obstructing member 40 in the descending leg shown. It will be understood that rising and descending legs of any practical cross-sectional shape may be used as well as the legs of rectangular shape shown.

Turning to Figure 4, we find a cross-sectional view of the preferred form of construction at the boot section of the conveyors. In this figure is shown the lower extremities of a rising leg 51 and a descending leg 52 communicating at their lower ends with a curved boot section 53. A feed hopper 56 is connected into the top side of the boot section 53 for delivery of solid particles thereinto. Catalyst inlet conduit 60 is connected into the top 57 of hopper 56 and a gas vent 61 is also connected into top 57 for withdrawal of gas in those operations where needed. Also shown in Figure 4 is the lower extremity of the volume obstructing member 40 in the descending leg 52.

In order to provide additional operation flexibility to such an apparatus as shown in Figure 1, it is generally desirable to provide between the conveyor discharge and the top of the catalyst receiving vessel a surge hopper. Such hopper may be installed in the conduits 16 and 23 shown on Figure 1, in which case they should be closed hoppers. Preferably, however, the surge hoppers may be built around the upper section of the conveyor rising and descending legs. Such an arrangement is shown in Figure 5. In Figure 5 is shown the upper section of rising leg 30 discontinuing by connection into a closed surge hopper 64 and then again continuing upwardly from the top 65 of the hopper 64. The descending leg extends upwardly within the hopper 34 terminating within the upper section thereof and then continuing upwardly from the top 65 of the hopper. Alternatively, the descending leg casing may continue without break through the hopper. The upper continuation of the legs communicate at their upper ends through head section 66 in which is positioned drive sprocket 67. The endless draft chain 34 extends longitudinally through the rising and descending legs and through the hopper 64 and over the sprocket 67. A catalyst drain conduit 68 extends from the lower end of the surge hopper 64 downwardly into the upper end of the gas-solid contact vessel 63. Throttle valve 86 is supplied on conduit 68 for control of the catalyst charge rates into vessel 63 in those operations where desirable. Alternately the catalyst flow control to the reactor may be regulated by its rate of discharge therefrom as already shown. A conduit 75 carrying valve 76 is connected between the conduit 68 and the descending leg 31 for supply of solid material to the descending leg. If desired, the conduit 75 may be connected directly between the bottom of hopper 64 and the descending leg 31. A level indicating device 69 extends downwardly through the top of hopper 64 to permit observation of the catalyst level within the hopper. The indicating device may be any of a number of types well-known to the art. This arrangement thus provides not only a catalyst surge hopper permitting added operation flexibility of the contact chamber 63, but also automatically provides a means for flow of a portion of the catalyst from the upper section of the rising leg 30 into the upper section of the descending leg 31 so as to provide a catalyst column in both legs. In this preferred modification of the apparatus seal protection in addition to that furnished by the catalyst columns within the rising and descending legs may be provided by the introduction of inert gas into the hopper 64 through conduit 70. The rate of such inert gas introduction may be controlled by diaphragm valve 71 operated by a differential pressure control instrument 72 so as to maintain an inert gaseous atmosphere within said hopper somewhat above the gaseous pressure within the upper section of the gas-solid contacting vessel 63. A minor portion of this inert gas will pass downwardly through the rising and descending legs. The major portion of the inert gas will pass along with the catalyst through conduit 68 into the upper section of vessel 63 from which it may be withdrawn along with contacting vapors through outlet conduit 73. It will be apparent to those skilled in the art that certain structural modifications of the apparatus shown in Figure 5 may be made without departure from the concept and purposes of this invention. It will be noted that in either the arrangement shown in Figure 1 or Figure 5, the catalyst from the upper end of the conveyor rising leg is conducted as a confined stream to the receiving vessel be it converter or regenerator.

It will be observed that in the arrangement shown in Figure 5, when the valve 76 on conduit 75 is left open, the amount of catalyst delivered into the descending leg 31 is automatically that which will maintain the leg 31 filled with catalyst up to the level of hopper 64 and is equal in amount to the quantity of catalyst that will be conveyed downwardly through the descending leg. Similar automatic control may be provided in the arrangement shown in Figure 1 by leaving open the valves 39 and 39' on conduits 38 and 38' respectively. These valves are generally needed for catalyst flow control only during "starting up" periods or during periods when the catalyst flow in the remainder of the cyclic system is out of balance and under radical adjustment. When the catalyst flow in the cyclic system is in balance, the catalyst flow through the conveyors will also reach a state of balance and substantially constant rate of flow at a state of balance the rate of the catalyst movement upwardly through the rising leg in each conveyor will be constant and equal to the sum of the catalyst flow circulation rate through the reaction or regeneration vessel plus the constant rate of catalyst flow downwardly through the descending leg. The proportionate rate of catalyst flow through the descending and rising legs may be varied by control of the size and shape of the volume obstructing members within the descending leg or by control of the relative free cross-sectional areas of the rising and descending legs. The proper construction of the volume obstructing member will vary depending upon the type and size of the solid material particles and upon the type of flights used on the conveyor chain. It has been found in general that the relative free cross-sectional areas of the rising and descending legs should be such as to provide from two to four times as much volumetric catalyst flow in the rising as in the descending leg.

The desirable length of the column of solid material to be maintained within the descending leg will vary depending upon the total gaseous pressure differential between the two chambers between which the solid material is being transferred. If the gaseous pressure differential is low, only a relatively short column of catalyst within the descending leg will provide adequate seal. In such a case the conduit 38 of Figure 1 may connect into the descending leg 31 at a level within the intermediate or lower section thereof.

Although it is generally preferable to provide for a recycling of solid material from the upper section of the rising leg to the descending leg, as described hereinabove, in some operations this recycling may be eliminated, and solid material from another source may be introduced into the descending leg. Thus, for example, a portion of the solid material passing from the reaction vessel 10 of Figure 1 through conduit 14 may be directed into inlet 80 on the descending leg 31' of conveyor 29' and a portion of the solid material from the regenerator 22 may be diverted from conduit 25 into inlet 81 on descending leg 31 of conveyor 29 so as to provide a column of the solid material throughout a vertical section of each of said descending legs.

The overall length of the conveyors will depend, of course, on the length of the reaction and regeneration vessels and may vary from about 10 to 100 feet in height; but in any event it will be apparent that by the provision of substantial solid material column type seals in the conveyors the requirement for space conserving feed lock chambers or elongated feed and drain legs above and below the reactor and regenerator vessels has been eliminated thereby permitting substantially shorter and more economical conveyors than have been permissible in such processes heretofore. Moreover, since the solid material may flow to and from the conveyors by gravity flow and then may be conveyed en masse as a substantially compact column, within the conveyor legs, the close metal to metal clearances and scraping action characteristic of screw conveyors or forced feed valves used by the art is eliminated, thereby permitting the circulation of catalysts with a minimum of attrition losses.

The above described method and apparatus is particularly adapted for particle form solids having an average particle diameter of the larger sizes ranging upwards, for example, from about ⅜". The minimum size of particle which may be handled successfully in this manner is somewhat dependent upon mechanical design of the conveyor, particularly clearances between the flights and casings.

Although the method and apparatus of this invention has been specifically described as applied to cyclic hydrocarbon conversion processes, it should be understood that the invention is not limited in its application thereto but may be applied to a large number of processes involving the movement of particle form solid material, which may or may not be catalytic in its nature, between separate chambers wherein it is contacted with different gaseous materials. It will also be understood that the details of apparatus construction and operation conditions and technique as shown in the drawings and described hereinabove are merely exemplary in nature and are in no way to be construed as limiting the scope of this invention except as it is otherwise limited in the following claims.

We claim:

1. In a hydrocarbon conversion process wherein a particle form catalyst is moved cyclically through a conversion zone wherein it is contacted with hydrocarbon vapors under pressure and through a regeneration zone wherein it is contacted with a combustion supporting gas under a lower pressure, the method of conveying said catalyst from said regeneration zone to said conversion zone while maintaining a substantial seal therebetween which method comprises: conducting said catalyst from said conversion zone through a purge zone wherein it is contacted with inert gas under a pressure slightly above that in said conversion zone, passing said catalyst as a confined compact stream from said purge zone into the lower end of a substantially upright rising leg, moving an endless draft mechanism upwardly through said rising leg so as to conduct said solid catalyst as a substantially compact column upwardly therethrough, moving said draft mechanism downwardly through a confined descending leg communicating at its ends with said rising leg, conducting a portion of the catalyst conveyed through said rising leg from the upper section thereof as a confined gravity flowing stream to said regeneration zone, conducting the remaining portion of said catalyst from the upper section of said rising leg to a point within the upper section of said descending leg so as to maintain a substantially compact column of said catalyst within said descending leg.

2. In a hydrocarbon conversion process wherein a particle form catalyst is moved cyclically through separate conversion and regeneration zones the method of conveying said catalyst from said regeneration zone to said conversion zone while maintaining a substantial seal therebetween without the use of mechanical locks, measuring valves and elongated gravity feed legs which method comprises: continuously moving an elongated draft conveyor chain upwardly through a confined rising leg and downwardly through a confined descending leg in communication at its ends with said rising leg, said descending leg being of substantially less free cross-sectional area along most of its length than said rising leg, admitting said catalyst as a confined stream from said regeneration zone to the lower end of said rising leg and conducting a portion of said catalyst conveyed through said rising leg from the upper section of said rising leg as a substantially compact gravity flowing stream to said conversion zone, conducting the remaining portion of said catalyst from the upper section of said rising leg to a point within the upper section of said descending leg so as to maintain a substantially compact column of said catalyst within said descending leg and maintaining an inert gaseous atmosphere within the upper sections of said rising and descending legs substantially above the gaseous pressure in the conversion and regeneration vessels.

3. In a process wherein particle form solid material is conveyed en masse upwardly through a confined rising leg from the lower end thereof to a selected discharge point within the upper section thereof by means of an endless draft mechanism moving upwardly through said rising leg and downwardly through a confined descending leg in communication at its ends with said rising leg and of substantially less free cross-sectional area along at least most of its length than said rising leg, the method of maintaining a substantial seal between the points of solid material entry and discharge to and from said rising leg which method comprises: introducing a controlled portion of said solid material into said descending leg so as to maintain a substantially compact column thereof within said descending leg and maintaining an inert gaseous atmosphere above the solid material in said rising and descending legs.

4. In a hydrocarbon conversion process wherein a particle form catalyst is moved cyclically through separate conversion and regeneration zones the method of conveying said catalyst from said regeneration zone to said conversion zone while maintaining a substantial seal therebetween without the use of mechanical locks, measuring valves and elongated gravity feed legs which method comprises: passing said catalyst as a confined stream from said regeneration zone into the lower end of a substantially upright rising leg, moving an endless draft mechanism upwardly through said rising leg so as to conduct said solid catalyst as a substantially compact column upwardly therethrough, moving said draft mechanism downwardly through a confined descending leg communicating at its ends with said rising leg, conducting a portion of the catalyst conveyed through said rising leg from the upper section thereof as a confined gravity flowing stream to said conversion zone, conducting the remaining portion of said catalyst from the upper section of said rising leg to a point within the upper section of said descending leg so as to maintain a substantially compact column of said catalyst within said descending leg and maintaining an inert gaseous atmosphere within the upper section of said rising and descending legs substantially above the gaseous pressure in the conversion and regeneration vessels.

5. In a process wherein particle form solid material is conveyed en masse upwardly through a confined rising leg from the lower end thereof to a selected discharge point within the upper section thereof by means of an endless draft mechanism moving upwardly through said rising leg and downwardly through a confined descending leg in communication at its ends with said rising leg, the method of maintaining a substantial seal between the points of solid material entry and discharge to and from said rising leg which method comprises: substantially continuously introducing a controlled amount of particle form solid material from a source outside the path of travel of said draft mechanism into said descending leg so as to maintain a substantially compact column thereof within said descending leg, and substantially continuously discharging solid material from said discharge point within the upper section of said rising leg to a location outside the path of travel of said draft mechanism.

6. In a hydrocarbon conversion system wherein a particle form solid catalyst is passed as a substantially compact column cyclically through separate reaction and regeneration vessels, apparatus for transfer of solid material from the regeneration to the reaction vessel while maintaining a seal between said vessels which appartus comprises: two substantially upright elongated conveyor legs, a curved boot section connecting and communicating the lower ends of said legs, a substantially closed surge hopper enclosing the upper ends of both of said legs, continuations of said legs extending upwardly from the top of said hopper, a head section connecting and communicating the upper ends of said continuations, a drive sprocket mounted within said head section and means to drive said sprocket, an endless chain mounted so as to travel longitudinally of said legs and over said drive sprocket, a plurality of flights attached along said chain, said flights being constructed so as to substantially prevent slippage of catalyst between the flights and the wall of said conveyor legs, volume obstructing means positioned within and along the major length of said descending leg such as to substantially reduce its free volume without interference with the movement of said chain and flights; an inlet to said boot section; a conduit extending downwardly from said regeneration chamber to said inlet for flow of solid material into said boot section, a drain conduit extending downwardly from said surge hopper to said reaction vessel, and means to maintain an inert gaseous pressure within said surge hopper above that in either of said vessels.

7. In a system wherein a particle form solid contact mass material is passed serially through each of two separate vessels maintained under different gaeous pressures, apparatus for transfer of said solid material from one of said vessels to the other while maintaining a substantial seal between said vessels which apparatus comprises: a conveyor casing including a substantially closed rising leg, a substantially closed descending leg, of substantially less free internal cross-sectional area throughout at least most of its length than said rising leg, a substantially closed head section connecting and communicating the upper ends of said legs, and a curved boot section connecting and communicating the lower ends of said legs; a head sprocket mounted within said head section; an endless chain extending longitudinally through the casing so as to travel through said legs and over said head sprocket; a plurality of flights attached along said chain, said flights being of such construction as to provide a clearance of less than about ⅜ of an inch between said flights and the inside of said legs; means to drive said head sprocket; an inlet to said boot section; a conduit extending downwardly from one of said two vessels to said inlet for flow of solid material into said boot section; an outlet for solid material near the upper end of said rising leg; a conduit extending downwardly from said outlet to the other one of said vessels; a conduit extending downwardly from a point within the upper section of and below the solid material outlet on said rising leg to a point on said descending leg substantially above its lower end.

8. In a hydrocarbon conversion system wherein a particle form solid catalyst is passed as a substantially compact column cyclically through separate reaction on regeneration vessels, apparatus for transfer of solid material from the regeneration to the reaction vessel while maintaining a seal between said vessels which apparatus comprises: a conveyor casing including a substantially closed, elongated rising leg, a substantially closed elongated descending leg, a substantially closed head section connecting and communicating the upper ends of said legs and a substantially closed, curved boot section connecting and communicating the lower ends of said legs; draft mechanism in said casing comprising an endless chain adapted to move longitudinally of the legs, a plurality of flights attached along said endless chain, said flights being of a shape and size providing a clearance of less than about ⅜ of an inch between the flights and the wall of said legs; volume obstructing means positioned within and along the major length of said descending leg such as to substantially reduce its free volume without interference with the movement of said chain and flights; an inlet to said boot section; a conduit extending downwardly from said regeneration chamber to said inlet for flow of solid material into said boot section; an outlet for solid material within the upper section of said rising leg; means to conduct solid material from said outlet as a substantially compact stream to said reaction vessel; an inlet for solid material on said descending leg within the upper section thereof; means to direct the flow of a portion of the solid material from the upper section of said rising leg into said inlet on said descending leg; and means to maintain an inert gaseous atmosphere within the upper section of said casing above that in the reactor and regeneration vessels.

9. In a system wherein a particle form solid contact mass material is passed serially through each of two separate vessels maintained under different gaseous pressures, apparatus for transfer of said solid material from one of said vessels to the other while maintaining a substantial seal between said vessels which apparatus comprises: a conveyor casing including a substantially closed rising leg, a substantially closed descending leg, a substantially closed head section connecting and communicating the upper ends of said legs, and a curved boot section connecting and communicating the lower ends of said legs, said descending leg having along most its length an internal cross-sectional area which is substantially less than the corresponding internal cross-sectional area of said rising leg and of said curved boot section; a head sprocket mounted within said head section; an endless chain extending longitudinally through the casing so as to travel through said legs and over said head sprocket; a plurality of flights attached along said chain, said flights being of such size and shape as to provide a close clearance between said flights and the wall of said legs; means to drive said head sprocket; an inlet to said boot section; a conduit extending downwardly from one of said two vessels to said inlet for flow of solid material into said boot section; an outlet for solid material near the upper end of said rising leg; a conduit extending downwardly from said outlet to the other of said vessels; an inlet for solid material on said descending leg within the upper section thereof; and means to direct the flow of a portion of the solid material from the upper section of said rising leg into said inlet on said descending leg.

10. In an apparatus involving two chambers maintained under different gaseous atmospheres, apparatus for transferring particle form solid material from one of said chambers to the other while maintaining a substantial seal between said chambers which apparatus comprises: a conveyor casing including a substantially closed elongated rising leg having an outlet for solid material discharge near its upper end, a substantially closed elongated descending leg, a substantially closed head section connecting and communicating the upper ends of said legs and a substantially closed boot section connecting and communicating the lower ends of said legs; a draft conveying mechanism extending as an endless chain longitudinally through said casing; means for moving said draft mechanism to convey solid material within said legs; a solid material inlet to the lower section of said casing; and means to introduce some of said particle form solid material into said descending leg at a level substantially above its lower end so as to maintain a column of said solid material therein, and a space obstructing member rigidly disposed within said descending leg below the location of said solid introduction means to said descending leg, said obstructing member extending along a major portion of the length of said descending leg and being adapted to occupy a substantial portion of of the free volume in said descending leg without interference with the movement of said draft mechanism.

11. In an apparatus involving two chambers maintained under different gaseous atmospheres, apparatus for transferring particle form solid material from one of said chambers to the other while maintaining a substantial gaseous seal between said chambers which apparatus comprises: a conveyor casing including a substantially closed elongated rising leg having an outlet for solid material discharge near its upper end, a substantially closed elongated descending leg, a substantially closed head section connecting and communicating the upper ends of said legs and a substantially closed boot section connecting and communicating the lower ends of said legs, said descending leg being of substantially less internal cross-sectional area along at least most of its length than said rising leg and than said boot section; a draft conveying mechanism extending as an endless chain longitudinally through said casing; means for moving said draft mechanism to convey solid material within said legs; an inlet for solid material introduction into the lower section of said casing; means to conduct said solid material as a substantially confined stream from one of said chambers to said inlet; means to conduct solid material from said outlet on said rising leg as a substantially confined stream to the other of said chambers; a conduit connecting into said descending leg a substantial distance above the lower end thereof and communicating it with a location outside said casing for supply of solid material into said descending leg.

12. In an apparatus involving two chambers maintained under different gaseous atmospheres, apparatus for transferring particle form solid material from one of said chambers to the other while maintaining a substantial seal between said chambers which apparatus comprises: a casing including a substantially closed elongated rising leg having an outlet for solid material discharge near its upper end, a substantially closed elongated descending leg of substantially less free internal cross-sectional area along at least most of its length than said rising leg, a substantially closed head section connecting and communicating the upper ends of said legs and a substantially closed boot section connecting and communicating the lower ends of said legs; a draft conveying mechanism extending as an endless chain longitudinally through said casing; means for moving said draft mechanism to convey solid material within said legs; an inlet for solid material within the lower section of said casing; means to conduct said solid material as a substantially confined stream from one of said chambers to said inlet; means to conduct solid material from said outlet on said rising leg as a substantially confined stream to the other of said chambers; and means to introduce some of said particle form solid material into said descending leg at a level substantially above its lower end so as to maintain a column of said solid material therein; means to maintain an inert gaseous atmosphere in the upper section of said casing at a pressure above that in either of said two chambers.

13. Apparatus for conducting particle form solid material between two chambers maintained under different gaseous pressures while maintaining a substantial seal between said chambers which apparatus comprises: two substantially upright elongated casings, one constituting a conveyor rising leg and the other a conveyor descending leg, an enclosed head section connecting said casings at their upper ends, a boot section connecting said casings at their lower ends, a draft conveying mechanism extending through said casings as an endless chain, means in said head section for moving said draft conveying mechanism to convey solid material through said casings, blocking means positioned within said conveyor descending leg along at least most of the length thereof such as to substantially restrict the free volume adapted for holding said particle form solid material while leaving space for free movement of said draft mechanism, an outlet for solid material discharge near the upper end of said rising casing, means to conduct solid material from said outlet as a confined stream to one of said chambers, an inlet for solid material on said boot section, means to conduct solid material as a confined stream from the other of said chambers to said inlet, conduit means for passage of a minor portion of the solid material conveyed through said rising leg into the upper section of said descending leg.

14. In an apparatus for conducting reactions involving gasiform reactants and involving the use of two separate reaction vessels through which a particle form solid material is cyclically passed, apparatus for conducting said particle form solid material from one vessel to the other while maintaining a substantial seal between said vessels which apparatus comprises: a casing including a substantially closed elongated rising leg, a substantially closed elongated descending leg, a substantially closed head section connecting and communicating the upper ends of said legs and a substantially closed boot section connecting and communicating the lower ends of said legs; an endless draft conveying mechanism mounted to move longitudinally of said casing; means for moving said draft mechanism so as to drag said solid material particle through said legs and boot section; volume obstructing means positioned within said descending leg and extending through at least most of its length, said obstructing means being of such shape and size as to avoid interference with the movement of said draft mechanism while substantially reducing the free volume of said descending leg; a solid material inlet to said boot section; a downwardly extending connecting conduit from one of said reaction vessels to said inlet for solid flow into said boot section; an outlet for solid discharge near the upper end of said rising leg; means to conduct solid material from said outlet as a substantialy confined stream to the second reaction vessel; means to transfer a portion of the solid material conveyed through said rising leg into the upper section of said descending leg to maintain a column of said solid material therein and means to maintain an inert gaseous pressure in the upper section of said casing above that in either of said reaction zones.

15. An apparatus according to claim 14 with the added improvement of, means defining a gas-solid disengaging chamber over and in communication with said boot section and gas outlet means from said chamber.

16. In an apparatus for conducting reactions involving gasiform reactants and involving the use of two separate reaction vessels through which a particle form solid material is cyclically passed, apparatus for conducting said particle form solid material from one vessel to the other while maintaining a substantial seal between said vessels which apparatus comprises: a casing including a substantially closed elongated rising leg, a substantially closed elongated descending leg, a substantially closed head section connecting and communicating the upper ends of said legs and a substantially closed boot section connecting and communicating the lower ends of said legs; an endless draft conveying mechanism mounted to move longitudinally of said casing; means for moving said draft mechanism so as to drag said solid material particles through said legs and boot section; volume obstructing means positioned within said descending leg and extending through at least most of its length, said obstructing means being of such shape and size as to avoid interference with the movement of said draft mechanism while substantially reducing the free volume of said descending leg; a solid material inlet to said boot section; a downwardly extending connecting conduit from one of said reaction vessels to said inlet for solid flow into said boot section; an outlet for solid discharge near the upper end of said rising leg; means to conduct solid material from said outlet as a substantially confined stream to the second reaction vessel; conduit means extending downwardly from a location on said rising leg below said solid material outlet to a location within the upper section of said descending leg; flow throttling means on said conduit; and means to maintain an inert gaseous pressure in the upper section of said casing above that in either of said reaction zones.

17. Apparatus for conducting particle form solid material between two separate gas-solid contact zones while maintaining a substantial seal between said zones which apparatus comprises: a casing including a substantially entirely closed rising leg, having an outlet near its upper end, a descending leg of substantially less lateral dimension than said rising leg, a head section connecting said legs at their upper ends and a boot section connecting said legs at their lower ends; a solid inlet to the lower section of said casing; endless draft conveying mechanism extending longitudinally through said casing; means for moving said draft mechanism to convey solid material from said inlet to said outlet; conduit means extending downwardly from a location on said rising leg below said solid outlet to a location therebelow on said descending leg a substantial distance above its lower end.

18. Apparatus for conducting particle form solid material between two chambers maintained under different gaseous pressures while maintaining a substantial seal between said chambers, which apparatus comprises: a casing including an elongated rising leg, an elongated descending leg, a head section connecting said legs at their upper ends and a boot section connecting said legs at their lower ends; a draft conveying mechanism extending as an endless chain longitudinally through said casing; means for moving said draft conveying mechanism to convey solid material through said legs; a solid material inlet to the lower section of said casing; an enclosed surge hopper built around said legs and in solid flow communication with a length of said rising leg near its upper end and below said head section; a drain conduit extending from said surge hopper to one of said chambers; means defining a passage for flow of solid material from said hopper into said descending leg; and blocking within said descending leg extending through at least the major portion of its length below said surge hopper, said blocking being of sufficient size to substantially reduce the free volume of said descending leg below that of said rising leg and being insufficient to interfere with the free movement of said draft mechanism.

19. Apparatus for transfer of particle form solid material from a first chamber to a second chamber while maintaining a substantial seal between the chambers which apparatus comprises: a casing including an upright substantially closed leg, an upright substantially closed descending leg, having along at least most of its length substantially less free cross-sectional area than said rising leg, a boot section communicating and connecting said legs at their lower ends, a head section connecting and communicating said legs at their upper ends, a closed common surge hopper inserted within the length of said rising leg near its upper end, so as to form a common portion of the length of said leg; a draft conveying mechanism extending as an endless chain longitudinally through said casing; drive means for moving said draft conveying mechanism to convey solid material particles through said legs and boot section; an inlet for said solid material within the lower section of said casing; means for conducting said solid material as a substantially compact stream from the first of said chambers to said inlet; an outlet for solid material flow from said hopper; means to conduct solid material from said outlet as a substantially compact stream to the second of said chambers; means to conduct solid material from said hopper to a point within the upper section of said descending leg; and means to maintain an inert gaseous atmosphere in said surge hopper above that in either of said chambers.

20. In an apparatus involving two chambers maintained under different gaseous atmospheres, apparatus for transferring particle-form solid material from one of said chambers to the other while maintaining a substantial seal between said chambers, which apparatus comprises: a casing including a substantially closed, elongated rising leg having an outlet for solid material discharge near its upper end, a substantially closed, elongated descending leg of substantially less free internal volume along at least most of its length than said rising leg, a substantially closed head section connecting and communicating the upper ends of said legs and a substantially closed boot section connecting and communicating the lower ends of said legs; a draft conveying mechanism extending as an endless chain longitudinally through said casing; means for moving said draft mechanism to convey solid material within said legs, means defining an enclosed solid-gas disengaging chamber above and in solid and gas flow communication with said boot section; an inlet for solid material into said disengaging chamber; a gas outlet from the top of said disengaging chamber; means to introduce gas into the upper section of said casing; and means to transfer a portion of said solid material conveyed through said rising leg to said descending leg a substantial distance above its lower end so as to maintain a column of said solid material within said descending leg.

21. In an apparatus for conducting reactions involving gasiform reactants and involving the use of two separate reaction vessels through which a particle form solid material is cyclically passed, apparatus for conducting said particle form solid material from one vessel to the other while maintaining a substantial seal between said vessels which apparatus comprises a casing including a substantially upright rising leg, a substantially upright descending leg, a head section communicating said legs at their upper ends, and a curved boot section communicating said legs on their lower levels, said boot sections having an opening in its roof; a draft conveying mechanism extending as an endless chain longitudinally through said casing; means associated with said head section to move said draft conveying mechanism longitudinally within said casing; space obstructing means positioned within said descending leg along at least most of its length, said obstructing means being of insufficient size to interfere with the movement of said draft mechanism through said descending leg but of sufficient size to materially reduce the free volume of said descending leg; members defining a gas-solid disengaging chamber over said opening in the roof of said boot section; an inlet to said disengaging chamber; downwardly sloping conduit means connecting one of said reaction vessels to said inlet for flow of solid material into said disengaging chamber; a gas outlet on the top of said disengaging chamber; an outlet for solid material from the upper section of said rising leg; means to conduct solid material as a compact stream from said outlet to the second of said reaction vessels; means to maintain an inert gaseous pressure within the upper section of said casing above the pressure in either of said reaction vessels; an inlet for solid material at a level within the upper section of said descending leg and means to conduct a portion of the solid material conveyed through said rising leg into said inlet.

22. The method for conveying particle form solid materials which comprises: continuously moving an endless draft conveyor mechanism through a confined, closed path of travel consisting of a confined rising leg through which it moves upwardly, a separate confined descending leg of substantially less free cross-sectional area along at least most of its length than said rising leg through which it moves downwardly and suitable sections communicating the upper ends and communicating the lower ends of said rising and descending legs; introducing particle form solid material from a source outside of said closed path of travel into said path at at least one point near the lower end of said rising leg; and substantially continuously introducing particle form solid material into said descending leg at at least one point along said descending leg a substantial distance above its lower end so as to provide a substantially compact column of said solid material therebelow in said descending leg, and withdrawing particle form solid material from said closed path of travel at a location within the upper section of said rising leg.

23. In a process wherein a particle form solid contact material is moved cyclically through at least two separate contact zones wherein it is contacted with fluid agents the method of conveying said contact material from one of said contact zones to the other which comprises: continuously moving an endless draft conveyor mechanism through a confined, closed path of travel consisting of a confined rising leg through which it moves upwardly, a separate confined descending leg of substantially less free cross-sectional area along at least most of its length than said rising leg through which said draft conveyor mechanism moves downwardly and suitable sections communicating the upper ends and communicating the lower ends of said rising and descending legs; introducing particle-form contact material from one of said contacting zones into said path at least at one point near the lower end of said rising leg, passing a portion of said contact material conveyed through said rising leg from the upper section of said rising leg to the other of said contact zones, passing the remaining portion of said contact material from the upper section of said rising leg to a location within the upper section of said descending leg so as to maintain a substantially compact column of said contact material within said descending leg.

ERIC V. BERGSTROM.
ERNEST UTTERBACK.

REFERENCES CITED

The following references are of record in the file of this patent:

UNITED STATES PATENTS

| Number | Name | Date |
| --- | --- | --- |
| 2,089,738 | Elmer | Aug. 10, 1937 |
| 2,252,460 | Sinden | Aug. 12, 1941 |
| 2,317,379 | Hemminger | Apr. 27, 1943 |
| 2,370,950 | Gibb et al. | Mar. 6, 1945 |

OTHER REFERENCES

Stephens, Adamson Mfg. Co., catalog 140, "Redler Elevator Conveyors," pages 5 and 23.